(12) United States Patent
Li et al.

(10) Patent No.: US 9,888,715 B2
(45) Date of Patent: Feb. 13, 2018

(54) ELECTRONIC CIGARETTE CASE

(71) Applicant: Shenzhen First Union Technology Co., Ltd., Shenzhen, Guangdong Province (CN)

(72) Inventors: Yonghai Li, Shenzhen (CN); Zhongli Xu, Shenzhen (CN); Mingtao Liu, Shenzhen (CN)

(73) Assignee: SHENZHEN FIRST UNION TECHNOLOGY CO., LTD., Shenzhen, Guangdong Province (CN)

( * ) Notice: Subject to any disclaimer, the term of this patent is extended or adjusted under 35 U.S.C. 154(b) by 0 days.

(21) Appl. No.: 15/405,242

(22) Filed: Jan. 12, 2017

(65) Prior Publication Data

US 2017/0208862 A1   Jul. 27, 2017

(30) Foreign Application Priority Data

Jan. 25, 2016  (CN) .................... 2016 2 0073870 U

(51) Int. Cl.
| | |
|---|---|
| *B65D 85/00* | (2006.01) |
| *A24F 15/20* | (2006.01) |
| *B65D 43/18* | (2006.01) |
| *A24F 47/00* | (2006.01) |
| *B65D 25/10* | (2006.01) |
| *H02J 7/00* | (2006.01) |
| *H01M 10/0525* | (2010.01) |

(52) U.S. Cl.
CPC ............ *A24F 15/20* (2013.01); *A24F 47/008* (2013.01); *B65D 25/108* (2013.01); *B65D 43/18* (2013.01); *B65D 85/70* (2013.01); *H01M 10/0525* (2013.01); *H02J 7/0045* (2013.01); *H02J 7/0047* (2013.01); *H01M 2220/30* (2013.01); *H02J 2007/005* (2013.01)

(58) Field of Classification Search
CPC ........ A24F 15/12; A24F 15/20; A24F 47/008; B65D 43/18; B65D 85/10; B65D 43/163
See application file for complete search history.

(56) References Cited

U.S. PATENT DOCUMENTS

| | | | | |
|---|---|---|---|---|
| 2,339,656 A | * | 1/1944 | Shina ................... | B65D 5/0005 206/264 |
| 3,881,599 A | * | 5/1975 | Flaherty ............. | B65D 85/1036 206/268 |
| 4,000,812 A | * | 1/1977 | Pisarski .................. | A24F 15/18 206/268 |

(Continued)

*Primary Examiner* — Briggitte R Hammond
(74) *Attorney, Agent, or Firm* — Cheng-Ju Chiang

(57) ABSTRACT

An electronic cigarette case for accommodating a cigarette. The electronic cigarette case comprises a housing main body and a rotation door mechanism arranged on the housing main body; the housing main body comprises a housing top face and a housing bottom face opposite to each other, and at least one first housing side face which is arc-shaped with a certain radian, an opening is formed in the first housing side face for picking and placing the cigarette; the rotation door mechanism at least comprises a rotation door which has an arc-shaped surface matching with the radian of the arc-shaped first housing side face, for covering the opening, and the rotation door is configured to have a capability of rotating along an arc plane defined by the radian thereof to expose the opening so as to take out or put into the cigarette.

20 Claims, 5 Drawing Sheets

(56) References Cited

U.S. PATENT DOCUMENTS

| | | | | |
|---|---|---|---|---|
| 4,588,081 A * | 5/1986 | Newsome | B65D 85/1036 | 206/251 |
| 4,852,729 A * | 8/1989 | Conte | A24F 15/18 | 206/236 |
| 5,605,226 A * | 2/1997 | Hernlein | A24F 15/18 | 206/496 |
| 9,415,929 B2 * | 8/2016 | Liu | A24F 15/12 | |
| 2005/0236005 A1 * | 10/2005 | Bears | A24F 15/18 | 131/235.1 |
| 2014/0326623 A1 * | 11/2014 | Alarcon | A24F 15/12 | 206/242 |
| 2015/0101944 A1 * | 4/2015 | Li | A24F 15/18 | 206/267 |
| 2015/0272211 A1 * | 10/2015 | Chung | A24F 15/00 | 206/242 |
| 2016/0165952 A1 * | 6/2016 | Liu | A24F 15/12 | 206/256 |
| 2016/0198763 A1 * | 7/2016 | Adkins | A24F 15/12 | 224/183 |

* cited by examiner

ELECTRONIC CIGARETTE CASE

CROSS-REFERENCE OF RELATED APPLICATIONS

This application is based upon and claims the benefit of priority from the prior Chinese Patent Application No. 201620073870.6, filed on Jan. 25, 2016, the entire contents of which are incorporated herein by reference.

FIELD OF THE DISCLOSURE

The present disclosure relates to the field of electronic cigarette, and more particularly, to an electronic cigarette case.

BACKGROUND OF THE DISCLOSURE

As attention being paid to the health increases, people have been aware of the dangers of tobacco to bodies, and electronic cigarettes have been appearing thereafter. An electronic cigarette usually provides nicotine liquid atomized by an atomizer for users to smoke. As there is no hazardous substance to bodies in the nicotine liquid, such as tar, the harm to users' bodies has been reduced largely. Meanwhile, just as there is no hazardous substance in the nicotine liquid, the dependence on smoking has also been reduced gradually after electronic cigarettes have been smoked by people. Therefore, electronic cigarettes have an effect to help to quit smoking.

To meet the smoking habits of smokers, and place and take electronic cigarettes conveniently, electronic cigarettes usually is placed in the electronic cigarette case matched therewith. A general electronic cigarette case comprises a case body and a case cover which may be opened reversely. Typically, there are traditional opening manners of the electronic cigarette in market, in most of which a flap-type structure is used.

SUMMARY OF THE DISCLOSURE

An electronic cigarette with a rotation door located on a side face, which is different from an opening manner on a top face, is disclosed in the disclosure.

In accordance with one aspect of the disclosure, an electronic cigarette case for accommodating a cigarette, comprising: a housing main body; and a rotation door mechanism arranged on the housing main body; wherein the housing main body comprises a housing top face and a housing bottom face opposite to each other, and at least one first housing side face which is arc-shaped with a certain radian, an opening is formed in the first housing side face for picking and placing the cigarette; the rotation door mechanism at least comprises a rotation door which has an arc-shaped surface matching with the radian of the arc-shaped first housing side face, for covering the opening, and the rotation door is configured to have a capability of rotating along an arc plane defined by the radian thereof to expose the opening so as to take out or put into the cigarette, both ends of which are oriented to the housing top face and the housing bottom face respectively.

Wherein, a slide rail, which is arc-shaped or annulus-shaped, is formed on an inner side of the housing bottom face, to guide the rotation door during opening or closing the rotation door.

Wherein, the housing main body further comprises a housing front face and a housing back face which are opposite to each other, and the first housing side face is formed between the housing front face and the housing back face.

Wherein, the housing main body further comprises a container formed therein, and the container is communicated with the opening and configured for accommodating the cigarette.

Wherein, a first slot is formed in the housing front face and communicated with the container, a second slot is formed in the housing back face and communicated with the container, and the first slot and the second opening slot are arranged face-to-face to put into and take out cigarettes by fingers conveniently; the first slot and the second slot are closed when the rotation door is in a closed state.

Wherein, wherein the are-shaped surface between two outer sides of the rotation door has a radian in a range of 170°~190°.

Wherein, wherein the rotation door mechanism further comprises a push button, a first slide slot which is arc-shaped is formed in the housing top face, and the push button passes through the first slide slot and is inserted into a push-button fixing hole of the rotation door such that the push button is fixed on the rotation door, and the push button is slidable along the first slide slot to drive the rotation door to slide along the first slide slot.

Wherein, the rotation door mechanism further comprises an adapter fixed to the housing top face and a torsion spring sleeved on the adapter, and one end of the torsion spring is fixed to the adapter and the other end of the torsion spring is fixed to the rotation door.

Wherein, the adapter comprises a flat portion connected to an inner side of the housing top face and a protrusion portion, a second slide slot which is arc-shaped is formed in the flat portion, the second slide slot faces to the first slide slot and has a length larger than or equal to that of the first slide slot, and the torsion spring is sleeved into the protrusion portion.

Wherein, further comprising a lithium battery and a elastic charging base arranged on an inner side of the housing bottom face and facing to the adapter, wherein the elastic charging base is electrically connected to the lithium battery, and one end of the cigarette is clamped into the elastic charging base and the other end of the cigarette is clamped into the protrusion portion of the adapter.

Wherein, further comprising a circuit plate and a display screen arranged on the housing main body and electrically connected to the circuit plate, wherein the circuit plate is connected to the lithium battery, and the display screen is configured for displaying an electric quantity of the lithium battery and a charging state of the cigarette.

Wherein, the lithium battery and the circuit plate are arranged on a front-housing or a back-housing of the housing main body.

Wherein, the housing top face is step-type at an area where the first slide slot is located.

Wherein, wherein the rotation door comprises a stress portion and a main portion, the stress portion is connected to the torsion spring and the push button, the stress portion is parallel to the housing top face and the flat portion of the adapter, the main portion is perpendicular to the stress portion.

Wherein, wherein an accommodating slot is formed in the stress portion to sleeve the stress portion into the protrusion portion, and the bottom of the stress portion is exposed from the protrusion portion.

In accordance with another aspect of the disclosure, an electronic cigarette case for accommodating a cigarette, comprising: a housing main body; and a rotation door mechanism arranged on the housing main body; wherein the housing main body comprises a housing top face and a housing bottom face opposite to each other, and at least one first housing side face which is arc-shaped with a certain radian, an opening is formed in the first housing side face for picking and placing the cigarette; the rotation door mechanism at least comprises a rotation door which has an arc-shaped surface matching with the radian of the arc-shaped first housing side face, for covering the opening, and the rotation door is configured to have a capability of rotating along an arc plane defined by the radian thereof to expose the opening so as to take out or put into the cigarette, both ends of which are oriented to the housing top face and the housing bottom face respectively; the rotation door mechanism further comprises a push button, a first slide slot which is arc-shaped is formed in the housing top face, and the push button passes through the first slide slot and is inserted into a push-button fixing hole of the rotation door such that the push button is fixed on the rotation door, and the push button is slidable along the first slide slot to drive the rotation door to slide along the first slide slot.

Wherein, the rotation door mechanism further comprises an adapter fixed to the housing top face and a torsion spring sleeved on the adapter, and one end of the torsion spring is fixed to the adapter and the other end of the torsion spring is fixed to the rotation door.

Wherein, the adapter comprises a flat portion connected to an inner side of the housing top face and a protrusion portion, a second slide slot which is arc-shaped is formed in the flat portion, the second slide slot faces to the first slide slot and has a length larger than or equal to that of the first slide slot, and the torsion spring is sleeved into the protrusion portion.

Wherein, the housing main body further comprises a housing front face and a housing back face which are opposite to each other, and the first housing side face is formed between the housing front face and the housing back face; and the housing main body further comprises a container formed therein, and the container is communicated with the opening and configured for accommodating the cigarette.

Wherein, a first slot is formed in the housing front face and communicated with the container, a second slot is formed in the housing back face and communicated with the container, and the first slot and the second opening slot are arranged face-to-face to put into and take out cigarettes by fingers conveniently; the first slot and the second slot are closed when the rotation door is in a closed state.

Beneficial effects of the disclosure may be as follows: different from the prior art, in the disclosure, an opening is formed in the first housing side face of the housing main body of the electronic cigarette case. The rotation door is used for covering the opening. The cigarette, both ends of which are oriented to the housing top face and housing bottom face, respectively, can be taken out or put into when the rotation door opens, when using the electronic cigarette case. Therefore, an electronic cigarette case with a new structure is provided in the disclosure. Further, as the rotation door is arranged on one side face of the housing main body, the height of the rotation door is not less than the length of the smoking set certainly. After the rotation door is opened, the cigarette is exposed in the air completely in the direction of the length thereof. Thus the type of the cigarette in the electronic cigarette case can be identified quickly when the rotation door is opened by users.

BRIEF DESCRIPTION OF THE DRAWINGS

In order to better illustrate technical implementations of the disclosure, hereinafter the accompanying drawings used in embodiments will be described simply. Obviously, the drawings as described are only some embodiments. All other drawings shall be obtained by those of skill in the art based on those drawings without making inventive efforts. Herein.

DETAILED DESCRIPTION OF THE DISCLOSURE

Now technical implementations of the disclosure will be described in definite and comprehensive details with reference to the accompanying drawings. Obviously, the embodiments as described are only some but not all the embodiments of the disclosure. All other embodiments obtained by those of skill in the art based on the embodiments of the disclosure without making inventive efforts shall all fall in the protection of the disclosure.

Figure 1:
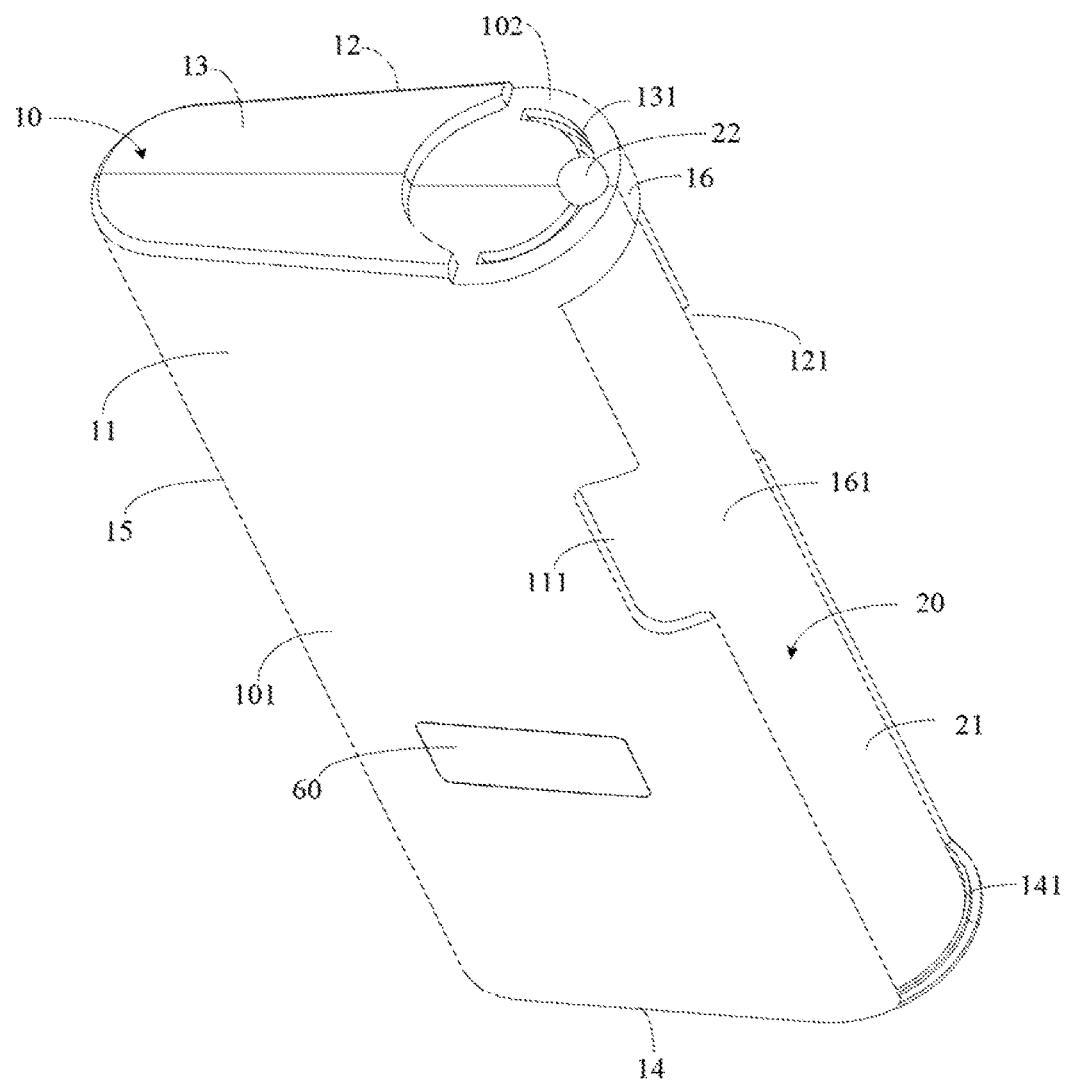
FIG. 1 is a structural view illustrating a electronic cigarette according to a preferable embodiment of the disclosure.
Figure 2:
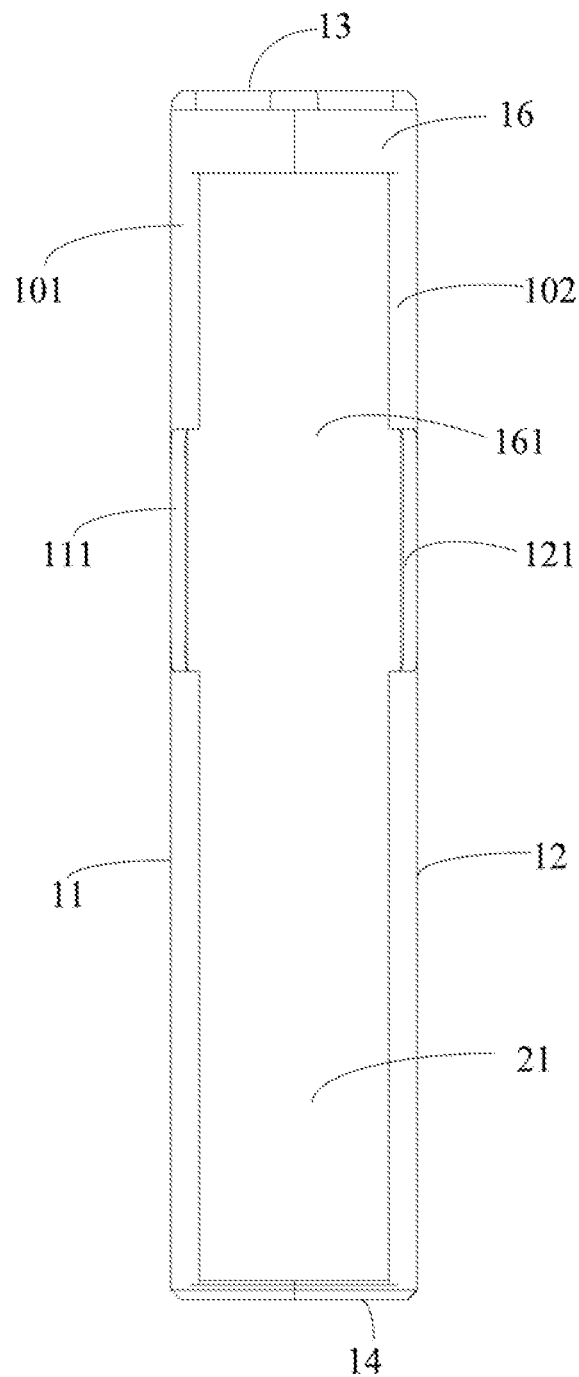
FIG. 2 is a schematic right view of the electronic cigarette case in FIG. 1.
Figure 3:
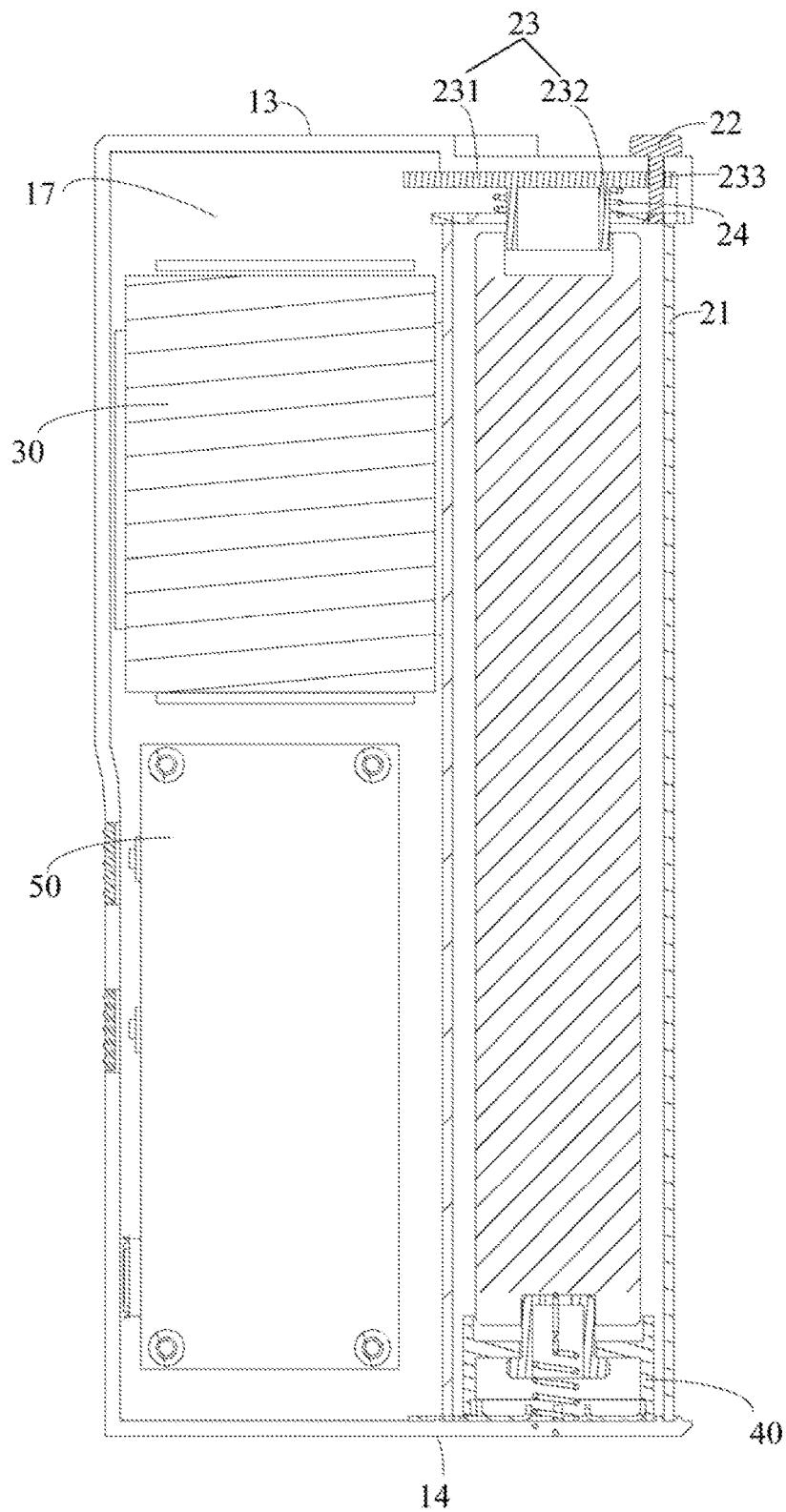
FIG. 3 is a schematic cutaway view of the electronic cigarette case in FIG. 1.
Figure 4:
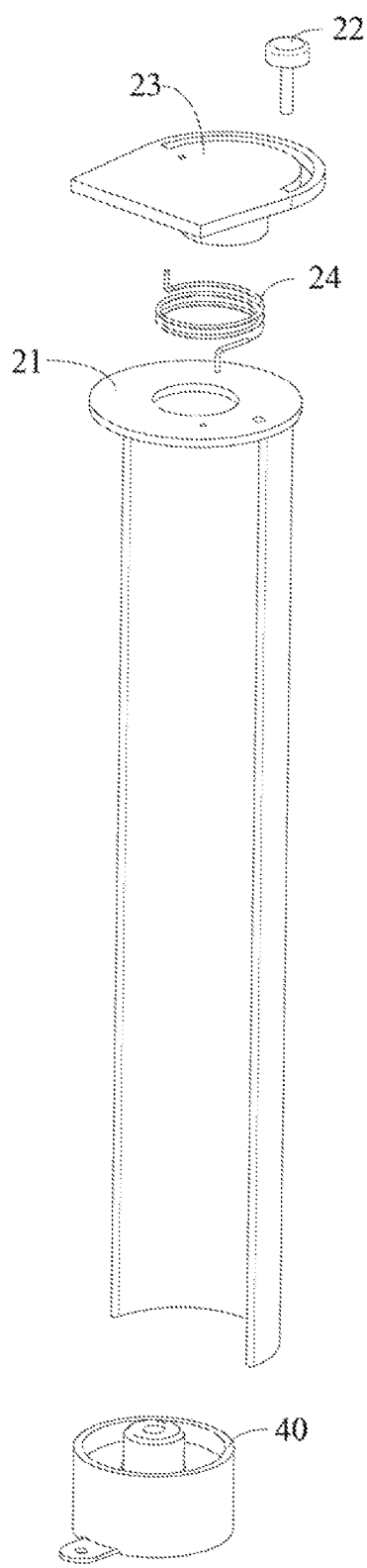
FIG. 4 is a disassembled view of sectional assemblies of the electronic cigarette case in FIG. 1.
Figure 5:
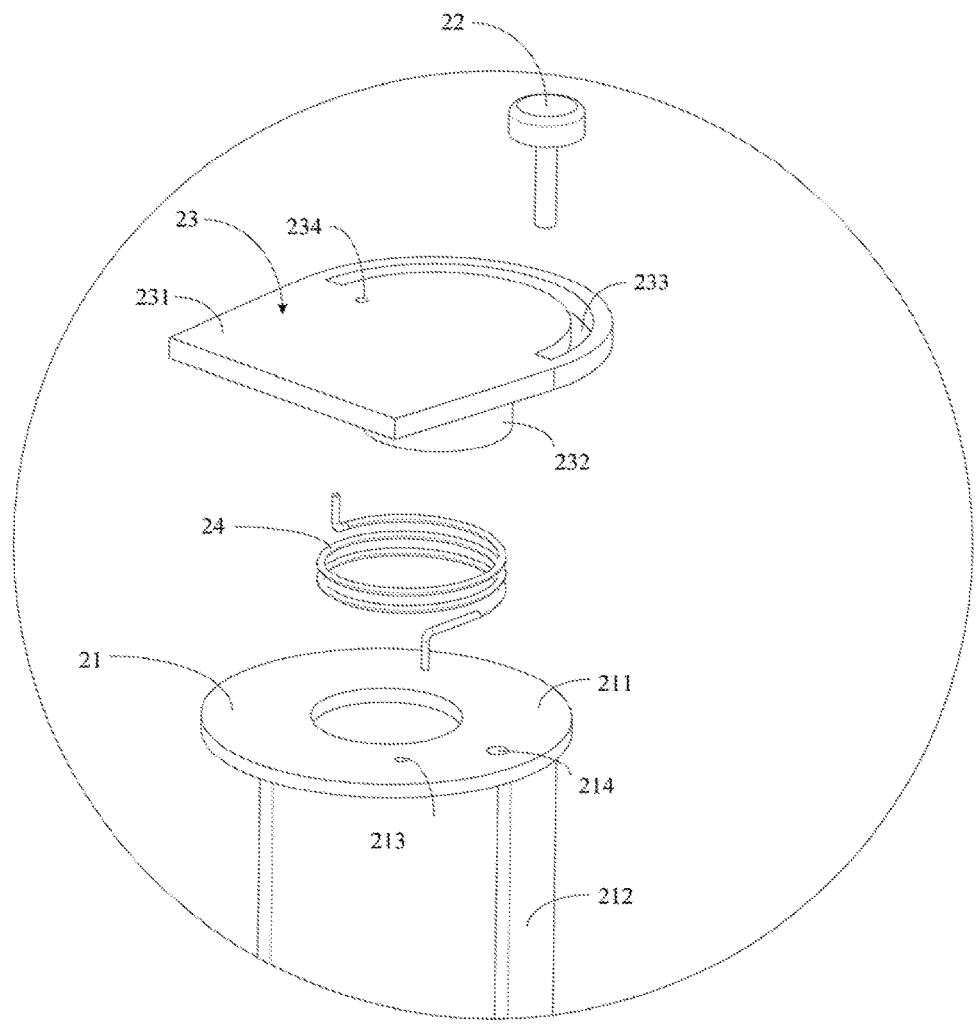
FIG. 5 is a partially enlarged view of sectional assemblies of the electronic cigarette case in FIG. 4.

Referring to FIGS. 1 and 2, the electronic cigarette case comprises a housing main body 10 and a rotation door mechanism 20. The housing main body 10 includes a front-housing 101 and a back-housing 102, which are buckled with each other. A housing body front face 11 and a housing body back body 12 which are opposite to each other, a housing top face 13 and a housing bottom face 14 which are opposite to each other, and a first housing side face 15 and a second housing side face 16 which are opposite to each other are formed after the front-housing 101 and the back-housing 102 have been buckled with each other. The aforementioned technical characteristics are named based on operation habits of users. When the electronic cigarette case is captured in hands by users, the surface facing to users is the housing front face, the face back to users is the housing back face, and two side faces is the first housing side face and the second housing side face, respectively, and for another two faces, the face upwards generally is the housing top face and the other is the housing bottom face. As an electronic cigarette case typically is a cigarette case, area of the housing front face or the housing back face is larger than areas of other faces.

It needs to be stated that the electronic cigarette case whose appearance approximates a square is merely taken as an example in this embodiment. The electronic cigarette case related in the disclosure may also be a cylinder, an oval or other shapes. No matter what shape the appearance of the electronic cigarette case is, the electronic cigarette case comprises a housing top face and a housing bottom face opposite to each other, and at least one housing side face with a certain radian, on which an opening is formed for picking and placing electronic cigarettes, and near which the rotation door mechanism 20 is mounted for exposing and covering the opening. In this way, the housing main body 10 further comprises a container 17 formed therein, and the container is communicated with the opening and configured for accommodating the cigarette. The specific structure of the rotation door mechanism 20 will be described below.

To make the housing main body 10 and the rotation door mechanism 20 be matched well, the first housing side face 16 and the second housing side face 15 are both an arc-shaped surface with a certain radian, and an opening 161 is formed in the first housing side face 16. The rotation door mechanism 20 at least includes a rotation door 21 having an arc-shaped surface which is slightly smaller than the semi-diameter of the first housing side face 16. The radian of the arc-shaped surface of the rotation door 21 is matched with the semi-diameter radian of the first housing side face 16, thus the rotation door 21 may roughly be rotated along an arc plane defined by the radian thereof, drove with an external force when covering the opening 161, and be opened to take out or put into a cigarette whose both ends are oriented to the housing top face 13 and the housing bottom face 14, respectively. Preferably, to reduce the width of the opening 161, a first slot 111 communicating with the opening 161 is formed in the housing front face 11, and a second slot 121 communicating with the opening 161 is formed in the housing back face 12. The first slot 111 and the second slot 121 are arranged face-to-face to put into and take out cigarettes by fingers conveniently. The rotation door 21, in the closed state, covers the first slot 111, the opening 161 and the second slot 121. The rotation door 21 is made of transparent material such as grasses or transparent plastic, in order to observe cigarettes conveniently for consumers when the rotation door 21 is closed.

As the opening 161 is formed in the first housing side face 16, cigarettes are put into and taken out through the side face of the electronic cigarette case. The cigarettes include but not limit to an e-cigarette, an atomizer, or a battery assembly for assembling the e-cigarette. An opening is formed in only one side of the electronic cigarette case in this embodiment. And in practical application, openings may also be both formed in both sides of the electronic cigarette case. Two openings are formed in both sides, respectively, one of which is used for placing electronic cigarettes, and the other of which is adopt for placing the atomizer or the battery assembly which is as accessory. A rotation door mechanism is provided corresponding to each opening, when two opening are formed in both sides of the electronic cigarette case. The opening 161 extends from the housing top face 13 to the housing bottom face 14 in this embodiment, thus the whole e-cigarette may be taken out. It can be understood that, as the length of the atomizer or battery assembly is smaller than that of the whole e-cigarette, the opening 161 is not needed to extend to the housing bottom face 14, when being used for placing and picking the atomizer or the battery assembly.

The electronic cigarette case in accordance with a preferable embodiment will be further described with reference to FIGS. 1 to 5.

The rotation door mechanism 20 further includes a push button 22, an adapter 23 and a torsion spring 24. The electronic cigarette case further comprises a lithium battery 30, an elastic charging base 40, a circuit plate 50 and a display screen 60.

Closing to the first housing side face 16, a first slide slot 131, which is arc-shaped, is formed in the housing top face 13 for assembling the push button 22. The housing top face 13 is step-type at an area where the first slide slot 131 is located with respect to the remaining areas of the housing top face 13, thus the push button 22 having been assembled onto the housing main body 10 will extend without beyond the top point of the housing top face 13.

The adapter 23 is fixed to the housing top face 13, more particularly, inside of the housing top face 13 where the first slide slot 131 is formed. The adapter 23 includes a flat portion 231 and a protrusion portion 232. The flat portion 231 is connected to the housing top face 13. A second slide slot 233 which is arc-shaped is formed in the flat portion 231, facing to the first slide slot 131. As the first slide slot 131 is exposed on the external surface of the electronic cigarette case, the part where the first slide slot 131 is beyond the second slide slot 233 shall easily be accumulated with dust, if the length of the first slide slot 131 is larger than that of the second slide slot 233. Therefore, the length of the first slide slot 131 is smaller than or equal to that of the second slide slot 233 preferably. A torsion-spring fixing hole 234 is formed in the flat portion 231 for fixing the torsion spring.

The torsion spring 24 is sleeved into the protrusion portion 232 of the adapter 23, one end of which is fixed to the torsion-spring fixing hole 234 of the adapter 23 and the other end of which is fixed to the torsion-spring fixing hole 213 of the rotation door 21. The push button 22 is inserted into the push-button fixing hole 214 of the rotation door 21, passing through the first slide slot 131 and the second slide slot 233 from the outside of the housing top face 13.

The rotation door 21 includes a stress portion 211 and a main portion 212. The stress portion 211 is connected to the torsion spring 24 and the push button 23, parallel to the housing top face 13 and the flat portion 231 of the adapter 23 and corresponding to the protrusion portion 232 of the adapter 23. An accommodating slot (not shown in FIGS.) is formed in the stress portion 211 to make the stress portion 211 to be sleeved into the protrusion portion 232, and the protrusion portion 232 to be exposed at the bottom of the stress portion 211. The torsion-spring fixing hole 213 for connecting the other end of the torsion spring 24 and the push-button fixing hole 214 for connecting the push button 22 are formed in the stress portion 211.

The main portion 212 is perpendicular to the stress portion 211, and the main portion 212 has a circular arc-shaped surface. To cover the first slot 111, the opening 161 and the second slot 121 effectively, the are-shaped surface between two outer sides of the main portion 212 of the rotation door has a radian in a range of 170°~190°, and preferably is 175°~185°.

A slide rail 141, which is arc-shaped or annulus-shaped, is formed inside of the housing bottom face 14, to enable the rotation door 21 sliding more smoothly. The bottom of the main portion 212 of the rotation door 21 is located in the slide rail 141, guiding the rotation door 21 during the process when the rotation door 21 is opened or closed.

The elastic charging base 40 is arranged an inner side of the housing bottom face 14, and the slide rail 141 extends around the elastic charging base 40, thus the elastic charging base 40 faces to the adapter 23 certainly. Both ends of the cigarette are clamped into the elastic charging base 40 and the protrusion portion 232, respectively, when the cigarette is put into the electronic cigarette case through the opening 161. In this way, both ends of the cigarette are positioned by the elastic charging base 40 and the protrusion portion 232 to prevent the smoking set rocking to be damaged or oil leaking.

The lithium battery 30 and the circuit plate 50 are arranged on the front-housing 101 or the back-housing 102, and the elastic charging base 40 is electrically connected to the lithium battery 30 through the circuit plate 50. The display screen 60 is disposed on the housing front face 11 of the housing main body 10 and electrically connected to the circuit plate 50. Except the above mentioned, a charging interface and a switch (not shown), etc, are arranged on the electronic cigarette case, and further the charging function may also be achieved by the charging interface, that is to say, the electronic cigarette case may be treated as a mobile power supply to charge external devices. For example, working states of the display screen 60 is controlled via the switch, and the display screen 60 is adopt to display an electric quantity of the lithium battery 30, an electric quantity of the cigarette and charging states of the cigarette, and the charging state of the cigarette may be further controlled via the switch according to the electric quantity of the cigarette displayed on the display screen 60, when the cigarette is put into the electronic cigarette case.

The process for putting the cigarette into the electronic cigarette case is: the push button 22 is pushed, and then the push button 22 slides along the first slide slot 131, in this way, the rotation door 21 is drove to rotate along the arc plane defined by the radian thereof, until the rotation door 21 is opened entirely. During the process when the rotation door 21 rotates, the torsion spring 24 is compressed. The bottom of the cigarette is clamped into the elastic charging base 40, the elastic charging base 40 is pushed downward, and the top of the cigarette is clamped into the protrusion portion 232 of the adapter 23 afterward, when the rotation door 21 has been opened entirely. After the cigarette has been put into the electronic cigarette case, the push button 22 is non-pushed, and the rotation door 21 is drove to rotate by elastic force of the torsion spring 24 along the direction which is opposite to the direction in which the rotation door 21 opens, until the second slot 121, the opening 161 and the first slot 111 is covered by the rotation door 21 entirely.

The above as mentioned is about merely preferable embodiments of the disclosure, and not restrictive in the practical application. The rotation door mechanism may merely comprise a rotation door, for example, on which a handle is arranged to open or close the rotation door when giving a force thereto, and a lock component is arranged to fix the rotation door to the housing main body when the rotation door closes. Perhaps, the rotation door mechanism comprises a rotation door, a push button to drive the rotation door to open or close, and a position mechanism to fix the rotation door to the housing main body when the rotation door closes. The push button and the handle aforementioned are both adopt to open the electronic cigarette case through manual operations. Then it can be understood that the rotation door may also be drove to rotate through a motor controlled automatically by a switch with a retarding mechanism, in order to open and close the electronic cigarette case more conveniently, which will not be described here. Again, the cigarette put into the electronic cigarette case is disposable, in this way, a lithium battery and a circuit plate, etc, may be omitted in the electronic cigarette case.

In conclusion, what one skilled in the art can understand, an opening is formed in the first housing side face of the housing main body of the electronic cigarette case in the disclosure. The rotation door is used for covering the opening. The cigarette, both ends of which are oriented to the housing top face and housing bottom face, respectively, can be taken out or put into when the rotation door opens, when using the electronic cigarette case. Therefore, an electronic cigarette case with a new structure is provided in the disclosure. Further, as the rotation door is arranged on one side face of the housing main body, the height of the rotation door is not less than the length of the smoking set certainly.

After the rotation door is opened, the cigarette is exposed in the air completely in the direction of the length thereof. Thus the type of the cigarette in the electronic cigarette case can be identified quickly when the rotation door is opened by users.

The above as mentioned is about merely some embodiments of the disclosure, and not restrictive to the scope of the disclosure hereafter. Any equivalent structure or flow transformations made to the disclosure with the specification and drawings of the disclosure, or any direct or indirect applications of the disclosure on other related fields, shall all be covered within the protection of the disclosure.

What is claimed is:

1. An electronic cigarette case for accommodating a cigarette, comprising:
   a housing main body; and
   a rotation door mechanism arranged on the housing main body;
   wherein the housing main body comprises a housing top face and a housing bottom face opposite to each other, and at least one first housing side face which is arc-shaped with a certain radian, an opening is formed in the first housing side face for picking and placing the cigarette;
   the rotation door mechanism at least comprises a rotation door which has an arc-shaped surface matching with the radian of the arc-shaped first housing side face, for covering the opening, and the rotation door is configured to have a capability of rotating along an arc plane defined by the radian thereof to expose the opening so as to take out or put into the cigarette, both ends of which are oriented to the housing top face and the housing bottom face respectively.

2. The electronic cigarette case according to claim 1, wherein a slide rail, which is arc-shaped or annulus-shaped, is formed on an inner side of the housing bottom face, to guide the rotation door during opening or closing the rotation door.

3. The electronic cigarette case according to claim 1, wherein the housing main body further comprises a housing front face and a housing back face which are opposite to each other, and the first housing side face is formed between the housing front face and the housing back face.

4. The electronic cigarette case according to claim 3, wherein the housing main body further comprises a container formed therein, and the container is communicated with the opening and configured for accommodating the cigarette.

5. The electronic cigarette case according to claim 4, wherein a first slot is formed in the housing front face and communicated with the container, a second slot is formed in the housing back face and communicated with the container, and the first slot and the second opening slot are arranged face-to-face to put into and take out cigarettes by fingers conveniently; the first slot and the second slot are closed when the rotation door is in a closed state.

6. The electronic cigarette case according to claim 1, wherein the arc-shaped surface between two outer sides of the rotation door has a radian in a range of 170°~190°.

7. The electronic cigarette case according to claim 1, wherein the rotation door mechanism further comprises a push button, a first slide slot which is arc-shaped is formed in the housing top face, and the push button passes through the first slide slot and is inserted into a push-button fixing hole of the rotation door such that the push button is fixed on the rotation door, and the push button is slidable along the first slide slot to drive the rotation door to slide along the first slide slot.

8. The electronic cigarette case according to claim 7, wherein the rotation door mechanism further comprises an adapter fixed to the housing top face and a torsion spring sleeved on the adapter, and one end of the torsion spring is fixed to the adapter and the other end of the torsion spring is fixed to the rotation door.

9. The electronic cigarette case according to claim 8, wherein the adapter comprises a flat portion connected to an inner side of the housing top face and a protrusion portion, a second slide slot which is arc-shaped is formed in the flat portion, the second slide slot faces to the first slide slot and has a length larger than or equal to that of the first slide slot, and the torsion spring is sleeved into the protrusion portion.

10. The electronic cigarette case according to claim 9, further comprising a lithium battery and a elastic charging base arranged on an inner side of the housing bottom face and facing to the adapter, wherein the elastic charging base is electrically connected to the lithium battery, and one end of the cigarette is clamped into the elastic charging base and the other end of the cigarette is clamped into the protrusion portion of the adapter.

11. The electronic cigarette case according to claim 10, further comprising a circuit plate and a display screen arranged on the housing main body and electrically connected to the circuit plate, wherein the circuit plate is connected to the lithium battery, and the display screen is configured for displaying an electric quantity of the lithium battery and a charging state of the cigarette.

12. The electronic cigarette case according to claim 11, wherein the lithium battery and the circuit plate are arranged on a front-housing or a back-housing of the housing main body.

13. The electronic cigarette case according to claim 7, wherein the housing top face is step-type at an area where the first slide slot is located.

14. The electronic cigarette case according to claim 9, wherein the rotation door comprises a stress portion and a main portion, the stress portion is connected to the torsion spring and the push button, the stress portion is parallel to the housing top face and the flat portion of the adapter, the main portion is perpendicular to the stress portion.

15. The electronic cigarette case according to claim 14, wherein an accommodating slot is formed in the stress portion to sleeve the stress portion into the protrusion portion, and the bottom of the stress portion is exposed from the protrusion portion.

16. An electronic cigarette case for accommodating a cigarette, comprising:
a housing main body; and
a rotation door mechanism arranged on the housing main body;
wherein the housing main body comprises a housing top face and a housing bottom face opposite to each other, and at least one first housing side face which is arc-shaped with a certain radian, an opening is formed in the first housing side face for picking and placing the cigarette;
the rotation door mechanism at least comprises a rotation door which has an arc-shaped surface matching with the radian of the arc-shaped first housing side face, for covering the opening, and the rotation door is configured to have a capability of rotating along an arc plane defined by the radian thereof to expose the opening so as to take out or put into the cigarette, both ends of which are oriented to the housing top face and the housing bottom face respectively; and
the rotation door mechanism further comprises a push button, a first slide slot which is arc-shaped is formed in the housing top face, and the push button passes through the first slide slot and is inserted into a push-button fixing hole of the rotation door such that the push button is fixed on the rotation door, and the push button is slidable along the first slide slot to drive the rotation door to slide along the first slide slot.

17. The electronic cigarette case according to claim 16, wherein the rotation door mechanism further comprises an adapter fixed to the housing top face and a torsion spring sleeved on the adapter, and one end of the torsion spring is fixed to the adapter and the other end of the torsion spring is fixed to the rotation door.

18. The electronic cigarette case according to claim 17, wherein the adapter comprises a flat portion connected to an inner side of the housing top face and a protrusion portion, a second slide slot which is arc-shaped is formed in the flat portion, the second slide slot faces to the first slide slot and has a length larger than or equal to that of the first slide slot, and the torsion spring is sleeved into the protrusion portion.

19. The electronic cigarette case according to claim 16, wherein the housing main body further comprises a housing front face and a housing back face which are opposite to each other, and the first housing side face is formed between the housing front face and the housing back face; and the housing main body further comprises a container formed therein, and the container is communicated with the opening and configured for accommodating the cigarette.

20. The electronic cigarette case according to claim 19, wherein a first slot is formed in the housing front face and communicated with the container, a second slot is formed in the housing back face and communicated with the container, and the first slot and the second opening slot are arranged face-to-face to put into and take out cigarettes by fingers conveniently; the first slot and the second slot are closed when the rotation door is in a closed state.

* * * * *